United States Patent
Binek et al.

(10) Patent No.: US 12,297,746 B2
(45) Date of Patent: May 13, 2025

(54) EROSION COMPENSATED VANE GEOMETRY

(71) Applicant: RTX Corporation, Farmington, CT (US)

(72) Inventors: Lawrence A. Binek, Glastonbury, CT (US); Yoel Bugin, Port St Lucie, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/485,103

(22) Filed: Oct. 11, 2023

(65) Prior Publication Data

US 2025/0122805 A1 Apr. 17, 2025

(51) Int. Cl.
| | |
|---|---|
| *F01D 5/14* | (2006.01) |
| *F01D 5/28* | (2006.01) |
| *F23R 3/14* | (2006.01) |
| B33Y 80/00 | (2015.01) |

(52) U.S. Cl.
CPC .............. *F01D 5/141* (2013.01); *F01D 5/28* (2013.01); *F23R 3/14* (2013.01); *B33Y 80/00* (2014.12); *F05D 2220/32* (2013.01); *F05D 2240/305* (2013.01)

(58) Field of Classification Search
CPC ........ F01D 5/141; F01D 5/28; F05D 2220/32; F05D 2240/305; B33Y 80/00; F23R 3/14
See application file for complete search history.

(56) References Cited

U.S. PATENT DOCUMENTS

| | | | | |
|---|---|---|---|---|
| 5,655,883 | A | * | 8/1997 | Schilling ................. F01D 5/147 416/241 A |
| 10,808,718 | B2 | * | 10/2020 | Hui .......................... F02K 3/06 |
| 11,795,831 | B2 | * | 10/2023 | Theertham .............. F01D 9/041 |
| 2004/0262276 | A1 | | 12/2004 | Davis et al. |
| 2009/0313823 | A1 | | 12/2009 | Rockstroh et al. |
| 2014/0166473 | A1 | | 6/2014 | Lipkin et al. |
| 2014/0308493 | A1 | * | 10/2014 | Ganesh ................. C23C 28/021 427/446 |
| 2015/0003990 | A1 | * | 1/2015 | Czerner ................. F01D 5/282 416/229 R |
| 2015/0267553 | A1 | | 9/2015 | Holland et al. |
| 2018/0216528 | A1 | | 8/2018 | Linassier et al. |
| 2020/0254546 | A1 | * | 8/2020 | Ducas .................... B23H 7/265 |
| 2021/0215054 | A1 | * | 7/2021 | Stimpson .............. F01D 11/003 |
| 2024/0133299 | A1 | * | 4/2024 | Karnati ................... F01D 5/147 |

OTHER PUBLICATIONS

Extended European Search Report for European Patent Application No. 24206139.8, dated Mar. 14, 2025, 8 pages.

\* cited by examiner

*Primary Examiner* — Topaz L. Elliott
*Assistant Examiner* — Andrew J Marien
(74) *Attorney, Agent, or Firm* — Kinney & Lange, P. A.

(57) ABSTRACT

A turbine vane for use in a gas turbine engine includes an airfoil section having a concave sidewall and a convex sidewall. Both the concave sidewall and convex sidewall extend spanwise between a platform and a radially outward airfoil tip and chordwise between a leading edge and a trailing edge. The concave sidewall includes a convex ablative region.

20 Claims, 2 Drawing Sheets

EROSION COMPENSATED VANE GEOMETRY

BACKGROUND

The present disclosure relates generally to gas turbine engine vanes and, more particularly, to gas turbine engine vanes having geometries designed to compensate for erosion.

As well known, gas turbine engines include a compressor section, combustor section, and turbine section. Many gas turbine engines used for aircraft propulsion include a fan section upstream of the compressor section and, in some configurations, a gear box between the fan section and the compressor section. Gas turbine engines are typically engineered to provide a desired level of performance (thrust, fuel efficiency, etc.) with a high degree of durability. For certain applications, such as life-limited applications, durability is less important than the ability to manufacture such engines at a low cost. As a result, less durable (and often less expensive) materials and simpler part designs are often used. While engines made with such materials and parts can provide acceptable performance for their limited lives, they can be less defect tolerant.

SUMMARY

One aspect of this disclosure is directed to a turbine vane for use in a gas turbine engine. The turbine vane includes an airfoil section having a concave sidewall and a convex sidewall. Both the concave sidewall and convex sidewall extend spanwise between a platform and a radially outward airfoil tip and chordwise between a leading edge and a trailing edge. The concave sidewall includes a convex ablative region.

Another aspect of the disclosure is directed to a gas turbine engine having a combustion section and a turbine nozzle downstream of the combustion section. The turbine nozzle includes a plurality of turbine vanes. Each of the plurality of turbine vanes includes an airfoil section with a concave sidewall and a convex sidewall. Both the concave sidewall and the convex sidewall extend spanwise between a platform and a radially outward airfoil tip and chordwise between a leading edge and a trailing edge. At least one of the plurality of turbine vanes is an ablative turbine vane that includes a concave sidewall having a convex ablative region.

Yet another aspect of the disclosure is directed to a method of testing a gas turbine engine that includes operating a combustion section to generate combustion section exhaust gases and directing the combustion section exhaust gases into and through a turbine nozzle. The turbine nozzle includes a plurality of turbine vanes. Each of the plurality of turbine vanes has an airfoil section with a concave sidewall and a convex sidewall. Both the concave sidewall and the convex sidewall extend spanwise between a platform and a radially outward airfoil tip and chordwise between a leading edge and a trailing edge. At least one of the plurality of turbine airfoils is an ablative turbine vane that includes a concave sidewall having a convex ablative region. The combustion section exhaust gases impinge on the convex ablative region of the ablative turbine vane causing the convex ablative region to ablate to form an aerodynamic surface on the concave sidewall.

DETAILED DESCRIPTION

Modern gas turbine engines used for aircraft propulsion are typically engineered to provide a desired level of performance (thrust, fuel efficiency, etc.) with a high degree of durability. For certain applications, such as life-limited applications, durability is less important than ability to manufacture such engines at a low cost. As a result, less durable (and often less expensive) materials and simpler part designs are often used. While engines made with such materials and parts can provide acceptable performance for their limited lives, they can be less defect tolerant. For example, combustors in such engines can be susceptible to instabilities and/or uneven distribution of hot exhaust gases, creating hot spots in downstream components such as the turbine nozzle that is immediately downstream of the combustor. The hot spots can cause erosion or burn through in vanes of the turbine nozzle.

Figure 1:
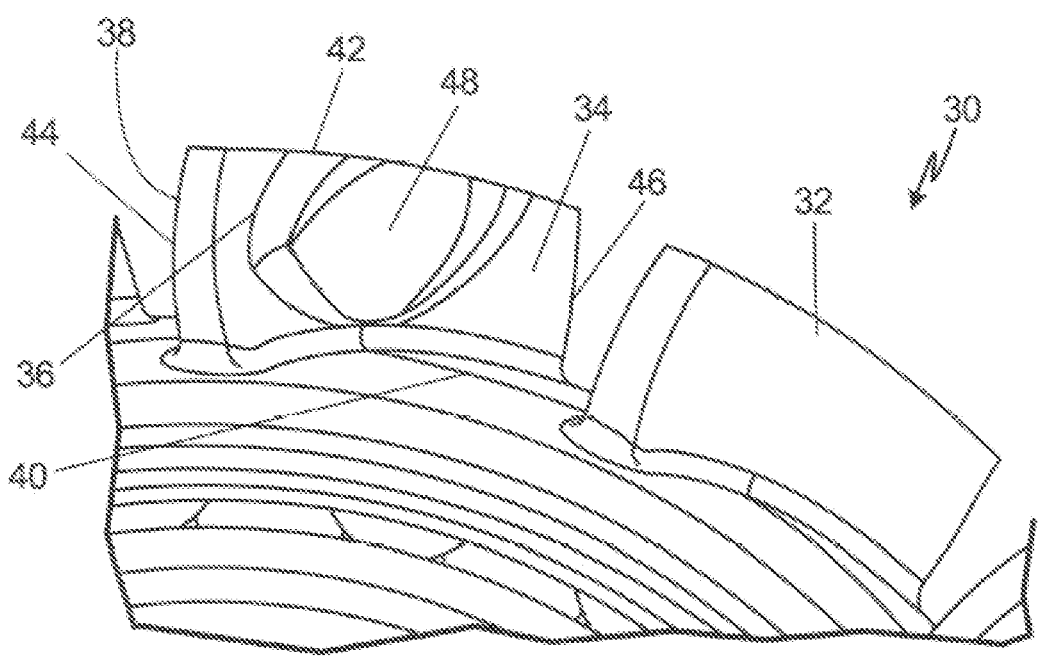
FIG. 1 is a view of two vanes on a turbine nozzle vane ring, one having an erosion compensated geometry and one having an aerodynamic geometry.

As shown in FIG. 1, an exemplary turbine nozzle 30 can have a plurality of turbine nozzle vanes 32, 34 attached to a vane ring 40. The vanes 32, 34 can be unshrouded so they do not have a shroud or platform at the vane tip 42. Unshrouded turbine nozzle vanes are sometimes used in life-limited engines to reduce costs and simplify manufacturing processes, particularly if the vanes are made with additive manufacturing techniques. As further discussed below, turbine nozzle vanes are airfoils, with each including a concave sidewall (also known as a pressure-side sidewall) and a convex sidewall (also known as a vacuum-side sidewall). Both the concave sidewall and convex sidewall extend spanwise between a platform, which can be a vane ring, and a radially outward airfoil tip and chordwise between a leading edge and a trailing edge. All features of the turbine nozzle vanes (i.e., the concave sidewall, the convex sidewall, the vane ring, the radially outward airfoil tip, the leading edge, and the trailing edge) are aerodynamic features that are designed to generate a desired aerodynamic performance. In some examples, some turbine nozzle vanes can experience regions of erosion or burn through resulting from combustor instability. While such damage can occur at any time in the life of a gas turbine engine, for life-limited engines, such damage can occur during initial acceptance testing due to the use of less robust materials and part designs selected as cost-saving measures. Because such damage often occurs to only a limited number of turbine nozzle vanes, gas turbine engines can pass acceptance testing despite the damage to one turbine nozzle vane or a small number of turbine nozzle vanes. Engines with damaged turbine nozzle vanes can have degraded performance or even shorter operational lives than their design point.

Figure 2:
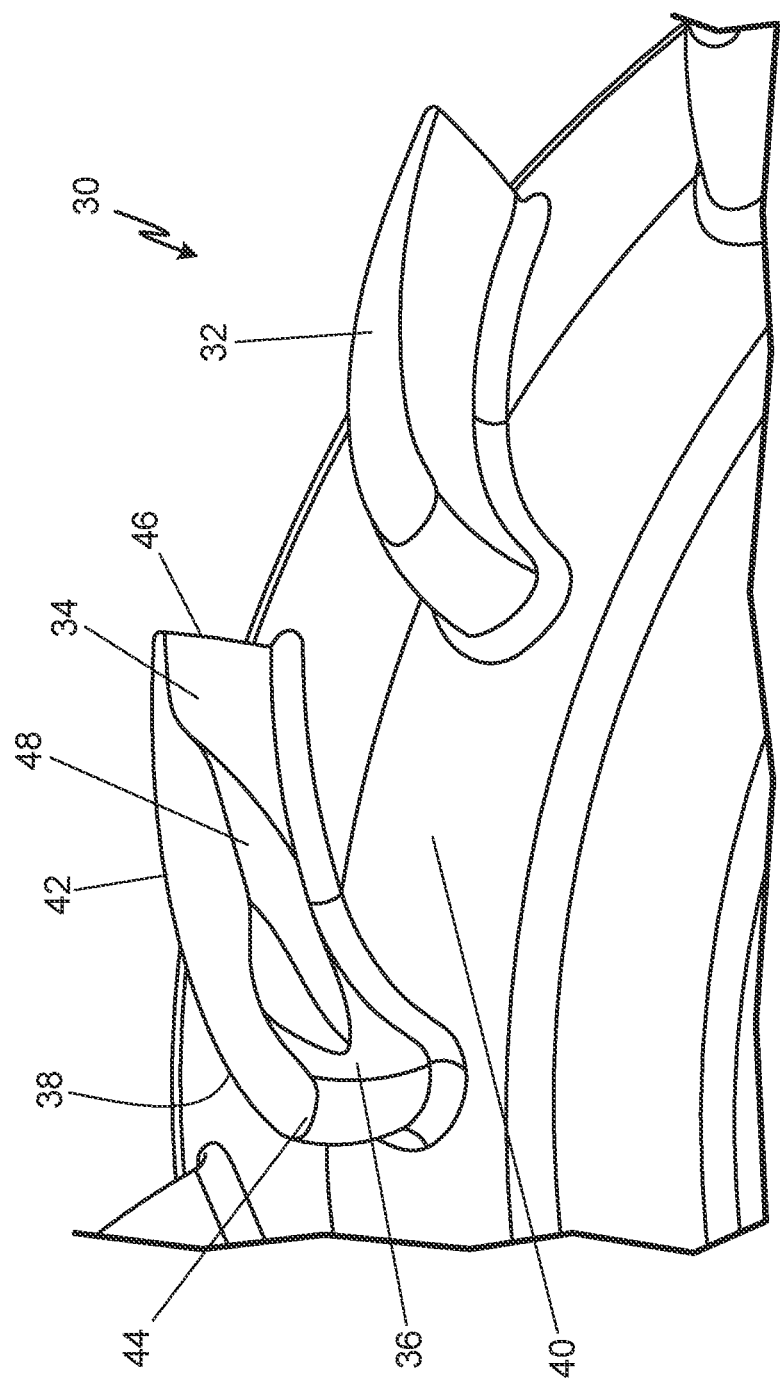
FIG. 2 is another view of two vanes on a turbine nozzle vane ring, one having an erosion compensated geometry and one having an aerodynamic geometry.

FIGS. 1 and 2 show that damage occurring to turbine nozzle 30 vanes 32, 34 during testing can be addressed by designing one or more vanes as ablative turbine vanes 34. Ablative vane 34 includes all of features of a conventional turbine nozzle vane, i.e., concave sidewall 36, a convex sidewall 38, a vane ring 40 that serves as a platform, a radially outward airfoil tip 42, a leading edge 44 and a trailing edge 46. As typical for turbine nozzle vanes, all such features are aerodynamic features that are designed to generate a desired aerodynamic performance. The distinguishing feature of ablative vane 34 is a convex ablative region 48 formed on the concave sidewall 36. Convex ablative region 48 is designed to be a non-aerodynamic sacrificial region positioned on the concave sidewall 36 at a location deemed to be susceptible to the type of erosion or burn through damage. As such, convex ablative region 48 is configured to ablate (i.e., erode or wear away) during acceptance testing procedures to leave an aerodynamic surface (not shown; see vane 32 for a rendering of any aerodynamic surface on the concave sidewall) on the concave sidewall 36 to allow the gas turbine engine in which the ablative vane 34 is installed to provide designed performance and life after acceptance testing. As shown in FIG. 1, the turbine nozzle can include a single ablative vane 34 or multiple ablative vanes 34 (not shown). FIG. 2 shows another view of ablative vane 34.

The specific dimensions of convex ablative region 48, location of the convex ablative region 48 on the concave sidewall 36, and the number and positioning of ablative vanes 34 in a gas turbine engine can be selected based on operational or analytical testing of a particular gas turbine engine design. In particular, any known instabilities associated with operation of the gas turbine engine's combustor with should be addressed. Other operational dynamics that could cause erosion of the convex ablative region 48 should also be considered in selecting the specific dimensions of convex ablative region 48, location of the convex ablative region 48 on the concave sidewall 32, and the number and positioning of ablative vanes 34 in a gas turbine engine.

The convex ablative region 48 can be formed on the ablative vane 34 during initial manufacture of the ablative vane 34 or added in a post-manufacture operation. For example, the ablative vane 34 with the convex ablative region 48 can be made using traditional manufacturing methods (e.g., casting or other traditional methods) or by additive manufacturing (AM) methods, including powder bed fusion (PBF) additive manufacturing methods. PBF AM is an additive manufacturing, or 3-D printing, technology that uses an energy source, such as a laser (PBF-LB) or electron beam (PBF-EB), to sinter or fuse metallic or polymeric particles together in a layer-by-layer process. The ablative vane 34 can be formed as a single part, a multi-component part (e.g., as a part of a doublet or triplet), or as part of a complete turbine nozzle 30 as shown in FIGS. 2 and 3. If formed as a complete turbine nozzle 30 using PBF AM techniques, a large format PBF AM machine can be used.

As discussed, the convex ablative region 48 can be formed on the ablative vane 34 in a post-manufacture operation, for example by using directed energy deposition (DED) techniques. Examples of suitable DED techniques include cold spray, blown powder, wire fed, and other DED processes that are known in the art. The specific DED technique and processing parameters can be selected based on part geometry, selected material, and other engineering considerations. Depending on the ablative material to be deposited to form the convex ablative region 48, other deposition techniques, such as material extrusion (MEX), binder jetting (BJT), vat photopolymerization (VPP) or other techniques, can be used.

The convex ablative region 48 can be formed on the ablative vane 34 using the same material used to make the ablative vane 34 (a first material) or using a different material deemed to provide more desirable ablative properties (a second material). If the ablative vane 34 is made with casting techniques, the convex ablative region 48 will made from the same material as the ablative vane 34, again a first cast material, if the concave ablative region 48 is formed as part of the casting process. If the convex ablative region 48 is not cast as part of the ablative vane 34, the convex ablative region 48 can be added by DED techniques or other techniques as discussed above, either using the same material as the ablative vane 34 or using a different material, a second material. If the ablative vane 34 is made with AM techniques, the convex ablative region 48 can either be made from the same material as the ablative vane 34 or a different material if the ablative region 48 is formed as part of the AM process. Of course, the convex ablative region 48 can be added by DED techniques or other techniques as discussed above, either using the same material as the ablative vane 34 or using a different material. Similarly, if the convex ablative region 48 is formed using AM or DED techniques or other techniques as discussed above, the convex ablative region 48 can be formed with the same density as the ablative vane 34 or with a different density, such as a lower density, to tailor the ablative properties of the convex ablative region 48 to provide desired results.

The ablative vane 34 and convex ablative region 48 can be formed with any materials that will provide the desired performance, including a desired life and a desired price point. For example, nickel-based alloys, such as INCO 625, may be selected for the ablative vane 34 and convex ablative region 48. Other materials known to be useful for turbine nozzle applications can also be selected.

The use of an ablative vane 34 having a convex ablative region 48 helps retain design life of the turbine nozzle by offsetting damage to particular vanes that can occur during acceptance testing. As a result, mission life remains at the desired design level rather than reduced by damage from acceptance testing. The added cost of including a convex ablative region 48 on an ablative vane 34 is minimal, particularly if the ablative vane 34 and convex ablative region 48 are formed using AM techniques. Even if the ablative vane 34 and convex ablative region 48 are formed using techniques other than AM techniques, the additional cost of forming the convex ablative region 48 can be limited compared to the benefits of including this feature. Another benefit of using AM techniques to form the convex ablative region 48 is the ability to size and position the convex ablative region 48 precisely on the concave sidewall 36. While the ablative vane 34 has been described in the context of turbine nozzle vanes, a person of ordinary skill will recognize that features of the disclosed ablative vane 34 can be applied to vanes used in other gas turbine engine applications, including but not limited to combustor vanes, other turbine vanes, etc.

DISCUSSION OF POSSIBLE EMBODIMENTS

The following are non-exclusive descriptions of possible embodiments of the present invention.

A turbine vane for use in a gas turbine engine in which the turbine vane includes an airfoil section having a concave sidewall and a convex sidewall. Both the concave sidewall and convex sidewall extend spanwise between a platform and a radially outward airfoil tip and chordwise between a leading edge and a trailing edge. The concave sidewall includes a convex ablative region.

The turbine vane of the preceding paragraph can optionally include, additionally and/or alternatively, any one or more of the following features, configurations and/or additional elements:

The turbine vane of the preceding paragraph, wherein the turbine vane comprises a nickel-based alloy.

The turbine vane of any of the preceding paragraphs, wherein the convex ablative region is configured to ablate during acceptance testing of the gas turbine engine to form an aerodynamic surface on the concave sidewall.

The turbine vane of any of the preceding paragraphs, wherein the turbine vane is formed by additive manufacturing techniques and the convex ablative region of the concave sidewall is formed as a unitary portion of the turbine vane.

The turbine vane of the preceding paragraph, wherein the convex ablative region of the concave sidewall is formed from the same material as the concave sidewall and has a lower density than the concave sidewall.

The turbine vane of any of the preceding paragraphs, wherein the turbine vane is formed by casting and the convex ablative region of the concave sidewall is formed as a unitary portion of the turbine vane.

The turbine vane of any of the preceding paragraphs, wherein the convex ablative region of the concave sidewall is formed on the concave sidewall using directed energy deposition techniques.

The turbine vane of the preceding paragraph, wherein the convex ablative region of the concave sidewall is formed from the same material as the concave sidewall and has a lower density than the concave sidewall.

The turbine vane of the preceding paragraph, wherein the convex ablative region of the concave sidewall is formed from a different material than the concave sidewall.

A gas turbine engine comprising a combustion section and a turbine nozzle downstream of the combustion section. The turbine nozzle includes a plurality of turbine vanes, each of which comprise an airfoil section with a concave sidewall and a convex sidewall. Both the concave sidewall and the convex sidewall extend spanwise between a platform and a radially outward airfoil tip and chordwise between a leading edge and a trailing edge. At least one of the plurality of turbine vanes is an ablative turbine vane that includes a concave sidewall having a convex ablative region.

The gas turbine engine of the preceding paragraph can optionally include, additionally and/or alternatively, any one or more of the following features, configurations and/or additional elements:

The gas turbine engine of the preceding paragraph, wherein the turbine nozzle includes more than one ablative turbine vane.

A method of testing a gas turbine engine, comprising operating a combustion section to generate combustion section exhaust gases and directing the combustion section exhaust gases into and through a turbine nozzle. The turbine nozzle includes a plurality of turbine vanes. Each of the plurality of turbine vanes comprises an airfoil section with a concave sidewall and a convex sidewall. Both the concave sidewall and the convex sidewall extend spanwise between a platform and a radially outward airfoil tip and chordwise between a leading edge and a trailing edge. At least one of the plurality of turbine airfoils is an ablative turbine vane that includes a concave sidewall having a convex ablative region. The combustion section exhaust gases impinge on the convex ablative region of the ablative turbine vane causing the convex ablative region to ablate to form an aerodynamic surface on the concave sidewall.

The method of the preceding paragraph can optionally include, additionally and/or alternatively, any one or more of the following features, configurations and/or additional elements:

The method of the preceding paragraph, wherein the turbine nozzle includes more than one ablative turbine vane and wherein combustion section exhaust gases impinging on the convex ablative region of each of the ablative turbine vanes causes the convex ablative region of each of the ablative turbine vanes to ablate to form an aerodynamic surface on the concave sidewall of each of the ablative turbine vanes.

The method of any of the preceding paragraphs, wherein each of the plurality turbine vanes comprises a nickel-based alloy.

The method of any of the preceding paragraphs, wherein each of the plurality turbine vanes is formed by additive manufacturing techniques and the convex ablative region of the ablative turbine vane is formed as a unitary portion of the ablative turbine vane.

The method of the preceding paragraph, wherein the convex ablative region of the ablative turbine vane is formed from the same material as the concave sidewall and has a lower density than the concave sidewall.

The method of any of the preceding paragraphs, wherein each of the plurality turbine vanes is formed by casting and the convex ablative region of the ablative turbine vane is formed as a unitary portion of the ablative turbine vane.

The method of any of the preceding paragraphs, wherein the convex ablative region of the ablative turbine vane is formed on the concave sidewall using directed energy deposition techniques.

The method of the preceding paragraph, wherein the convex ablative region of the concave sidewall is formed from the same material as the concave sidewall and has a lower density than the concave sidewall.

The method of the preceding paragraph, wherein the convex ablative region of the concave sidewall is formed from a different material than the concave sidewall.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A turbine vane for use in a gas turbine engine, the turbine vane comprising:
   an airfoil section having a concave sidewall and a convex sidewall, wherein both the concave sidewall and convex sidewall extend spanwise between a platform and a radially outward airfoil tip and chordwise between a leading edge and a trailing edge,
   wherein the concave sidewall includes a convex ablative region, wherein the convex ablative region is a non-aerodynamic sacrificial region positioned on the concave sidewall at a location deemed to be susceptible to erosion or burn through damage.

2. The turbine vane of claim 1, wherein the turbine vane comprises a nickel-based alloy.

3. The turbine vane of claim 1, wherein the convex ablative region is configured to ablate during acceptance testing of the gas turbine engine to form an aerodynamic surface on the concave sidewall.

4. The turbine vane of claim 1, wherein the turbine vane is formed by additive manufacturing techniques and the convex ablative region of the concave sidewall is formed as a unitary portion of the turbine vane.

5. The turbine vane of claim 4, wherein the convex ablative region of the concave sidewall is formed from the same material as the concave sidewall and has a lower density than the concave sidewall.

6. The turbine vane of claim 1, wherein the turbine vane is formed by casting and the convex ablative region of the concave sidewall is formed as a unitary portion of the turbine vane.

7. The turbine vane of claim 1, wherein the convex ablative region of the concave sidewall is formed on the concave sidewall using directed energy deposition techniques.

8. The turbine vane of claim 7, wherein the convex ablative region of the concave sidewall is formed from the same material as the concave sidewall and has a lower density than the concave sidewall.

9. The turbine vane of claim 7, wherein the convex ablative region of the concave sidewall is formed from a different material than the concave sidewall.

10. A gas turbine engine comprising:
a combustion section; and
a turbine nozzle downstream of the combustion section, wherein the turbine nozzle includes a plurality of turbine vanes and wherein each of the plurality of turbine vanes comprise an airfoil section with a concave sidewall and a convex sidewall, wherein both the concave sidewall and the convex sidewall extend spanwise between a platform and a radially outward airfoil tip and chordwise between a leading edge and a trailing edge;
wherein at least one of the plurality of turbine vanes is an ablative turbine vane that includes a concave sidewall having a convex ablative region, wherein the convex ablative region is a non-aerodynamic sacrificial region positioned on the concave sidewall at a location deemed to be susceptible to erosion or burn through damage.

11. The gas turbine engine of claim 10, wherein the turbine nozzle includes more than one ablative turbine vane.

12. A method of testing a gas turbine engine, comprising:
operating a combustion section to generate combustion section exhaust gases; and
directing the combustion section exhaust gases into and through a turbine nozzle, wherein:
the turbine nozzle includes a plurality of turbine vanes;
each of the plurality of turbine vanes comprises an airfoil section with a concave sidewall and a convex sidewall, wherein both the concave sidewall and the convex sidewall extend spanwise between a platform and a radially outward airfoil tip and chordwise between a leading edge and a trailing edge; and
at least one of the plurality of turbine airfoils is an ablative turbine vane that includes a concave sidewall having a convex ablative region, wherein the convex ablative region is a non-aerodynamic sacrificial region positioned on the concave sidewall at a location deemed to be susceptible to erosion or burn through damage;
wherein the combustion section exhaust gases impinge on the convex ablative region of the ablative turbine vane causing the convex ablative region to ablate to form an aerodynamic surface on the concave sidewall.

13. The method of claim 12, wherein the turbine nozzle includes more than one ablative turbine vane and wherein combustion section exhaust gases impinging on the convex ablative region of each of the ablative turbine vanes causes the convex ablative region of each of the ablative turbine vanes to ablate to form an aerodynamic surface on the concave sidewall of each of the ablative turbine vanes.

14. The method of claim 12, wherein each of the plurality turbine vanes comprises a nickel-based alloy.

15. The method of claim 12, wherein each of the plurality turbine vanes is formed by additive manufacturing techniques and the convex ablative region of the ablative turbine vane is formed as a unitary portion of the ablative turbine vane.

16. The method of claim 15, wherein the convex ablative region of the ablative turbine vane is formed from the same material as the concave sidewall and has a lower density than the concave sidewall.

17. The method of claim 12, wherein each of the plurality turbine vanes is formed by casting and the convex ablative region of the ablative turbine vane is formed as a unitary portion of the ablative turbine vane.

18. The method of claim 12, wherein the convex ablative region of the ablative turbine vane is formed on the concave sidewall using directed energy deposition techniques.

19. The method of claim 18, wherein the convex ablative region of the concave sidewall is formed from the same material as the concave sidewall and has a lower density than the concave sidewall.

20. The method of claim 18, wherein the convex ablative region of the concave sidewall is formed from a different material than the concave sidewall.

* * * * *